(12) United States Patent
Matsumoto et al.

(10) Patent No.: US 11,853,517 B2
(45) Date of Patent: Dec. 26, 2023

(54) TOUCH SENSOR

(71) Applicant: Nissha Co., LTD., Kyoto (JP)

(72) Inventors: Kousuke Matsumoto, Kyoto (JP); Mitsuru Kagase, Kyoto (JP); Teruyuki Kogo, Kyoto (JP)

(73) Assignee: NISSHA CO., LTD., Kyoto (JP)

(*) Notice: Subject to any disclaimer, the term of this patent is extended or adjusted under 35 U.S.C. 154(b) by 22 days.

(21) Appl. No.: 17/771,352

(22) PCT Filed: Sep. 8, 2020

(86) PCT No.: PCT/JP2020/034008
§ 371 (c)(1),
(2) Date: Apr. 22, 2022

(87) PCT Pub. No.: WO2021/079635
PCT Pub. Date: Apr. 29, 2021

(65) Prior Publication Data
US 2022/0374101 A1    Nov. 24, 2022

(30) Foreign Application Priority Data

Oct. 23, 2019   (JP) ................................ 2019-193040

(51) Int. Cl.
| | |
|---|---|
| *G06F 3/044* | (2006.01) |
| *B32B 3/14* | (2006.01) |
| *B32B 7/12* | (2006.01) |
| *B32B 27/08* | (2006.01) |
| *G01D 5/24* | (2006.01) |
| *B32B 27/28* | (2006.01) |

(Continued)

(52) U.S. Cl.
CPC .............. *G06F 3/0445* (2019.05); *B32B 3/14* (2013.01); *B32B 7/12* (2013.01); *B32B 27/08* (2013.01); *G01D 5/24* (2013.01); *B32B 27/286* (2013.01); *B32B 27/302* (2013.01); *B32B 27/306* (2013.01); *B32B 27/308* (2013.01); *B32B 27/322* (2013.01); *B32B 27/325* (2013.01); *B32B 27/34* (2013.01); *B32B 27/36* (2013.01); *B32B 27/40* (2013.01); *B32B 2250/24* (2013.01); *B32B 2307/412* (2013.01); *B32B 2307/558* (2013.01); *G06F 2203/04103* (2013.01)

(58) Field of Classification Search
None
See application file for complete search history.

(56) References Cited

U.S. PATENT DOCUMENTS

2017/0185187 A1    6/2017    Nakayama et al.

FOREIGN PATENT DOCUMENTS

| | | |
|---|---|---|
| CN | 208938073 U | 6/2019 |
| JP | 4901660 B2 | 3/2012 |

(Continued)

*Primary Examiner* — Nicholas J Lee
(74) *Attorney, Agent, or Firm* — JCIPRNET

(57) ABSTRACT

A touch sensor, including a transparent film substrate; a front electrode formed on one surface of the transparent film substrate; a front terminal formed on the surface of the transparent film substrate where the front electrode is formed, the front terminal being connected to the front electrode; a back electrode formed on the other surface of the transparent film substrate; and a back terminal formed on the surface of the transparent film substrate where the back electrode is formed, the back terminal being not overlapping with the front terminal in a plan view and being connected to the back electrode.

3 Claims, 9 Drawing Sheets

(51) Int. Cl.
*B32B 27/30* (2006.01)
*B32B 27/32* (2006.01)
*B32B 27/34* (2006.01)
*B32B 27/36* (2006.01)
*B32B 27/40* (2006.01)

(56) References Cited

FOREIGN PATENT DOCUMENTS

| WO | WO 2015015691 | 2/2015 |
|----|---------------|--------|
| WO | WO 2016038940 | 3/2016 |

PLAN VIEW

TOUCH SENSOR

CROSS REFERENCES TO RELATED APPLICATIONS

This application is a continuation of International Application No. PCT/JP2020/034008, filed on Sep. 8, 2020, which claims priority to Japanese Patent Application 2019-193040, filed on Oct. 23, 2019, which is incorporated herein by reference.

TECHNICAL FIELD

The present disclosure relates to a touch sensor that is excellent in cracking resistance.

BACKGROUND

Conventionally, a touch sensor has been widely used as input units. Touch sensors are in many cases used as input units for various devices (for example, ticket vending machines, ATM (Automated Teller Machine) machines, mobile phones, and gaming devices) in which display devices such as organic EL (electroluminescent), liquid crystal displays, and plasma displays are mounted, together with the display devices. In such devices, the touch sensors each are disposed on the display surface of the display device, and thus the touch sensor allows for very direct input to the display device.

Various methods of devices as such touch sensors have been put to practical use. A touch sensor of some of the touch sensors, which is referred to as an electrostatic capacitance method, is configured to form an electric field by applying a weak current to the touch sensor surface and to output, as a signal, a contact position that is obtained by converting a change in capacitance value, when a conductor such as a finger is slightly touched, to a decrease in voltage or the like and detecting the change.

A touch sensor in which a transparent electrode and a connection terminal section are formed on a pair of opposing substrates is generally known as the touch sensor used in the electrostatic capacitance method. Additionally, a touch sensor in which a transparent electrode and a connection terminal section are formed respectively on both sides of a single transparent substrate (hereinafter, referred to as a double-sided touch sensor) is known as another aspect (for example, Patent Document 1).

The double-sided touch sensor includes a small number of members, which can provide a touch sensor with reduction in thickness, improvement in productivity that is allowed by manufacturing with a roll-to-roll process, or the like. Moreover, since there is no need to bond two substrates together, defects such as positional misalignment between the two transparent electrodes can be avoided.

In general, as the structure of the double-sided touch sensor, a structure in which an upper protective film and a lower protective film are bonded together on a transparent film substrate of resin, glass, or the like including surfaces is widely used, where a film including a transparent conductive film being adhered thereon is applied on one of opposing surfaces of the transparent film substrate, on which metal patterning is formed, as the upper protective film and a film including a transparent conductive film being adhered thereon is applied on the other of the opposing surfaces of the transparent film substrate as the lower protective film.

Electrodes and a control circuit of the touch sensor are connected through a flexible printed circuit board (hereinafter, referred to as FPC). A wiring board terminal section located at one end portion of the FPC is connected to a front terminal and a back terminal that are located on the transparent film substrate. The upper protective film and the lower protective film are provided with a cut portion at the position corresponding to an FPC bonding portion, thereby bonding between the FPC and a sheet terminal section is facilitated.

After the upper protective film and the lower protective film provided with the cut portion are adhered to the transparent film substrate, the double-sided touch sensor is manufactured through a process of outline blanking for cutting to a predetermined product size.

However, a cushion material 18 is provided at an inner side of an outline blanking die 17. Accordingly, at the time of cutting to the predetermined production size with the outline blanking die 17, the upper protective film 2 is pressed against the cushion material 18 at the inner side of the outline blanking die 17, and stress is applied in the vertical direction. In this case, only one layer of the transparent film substrate 1 is exposed on the inner side of the cut portion while three layers of the transparent film substrate 1, the upper protective film 2, and the lower protective film 3 are disposed on the outer side of the cut portion, therefore, there is a problem in which the stress is concentrated on the interface portion at the inner side of the cut portion, and cracking may be generated toward the transparent film substrate 1 from both ends, which extend from the inner side to the outer side of the cut portion, of an opening end of the cut portion (see FIG. 8*a* and FIG. 8*b*).

CITATION LIST

Patent Literature

Patent Document 1: JP 4901660 A

SUMMARY

Problems to be Solved by the Present Disclosure

The present disclosure provides a touch sensor that has solved the problem described above and is excellent in cracking resistance.

Features for Solving the Problems

A touch sensor of an aspect of the present disclosure includes, a transparent film substrate, a front electrode formed on one surface of the transparent film substrate, a front terminal formed on the surface of the transparent film substrate where the front electrode is formed, the front terminal being connected to the front electrode, a back electrode formed on the other surface of the transparent film substrate; and a back terminal formed on the surface of the transparent film substrate where the back electrode is formed, the back terminal being not overlapping with the front terminal in a plan view and being connected to the back electrode. The transparent film substrate includes a connection terminal section on an inner side of one side of the transparent film substrate. The transparent film substrate is layered with a pair of films of an upper protective film and a lower protective film. In the touch sensor in which cut portions obtained by cutting out regions facing the front terminal and the back terminal are provided in both of the pair of films, each of the cut portions is formed to have a trapezoidal shape that gradually widens from an opening end toward an inward portion of the cut portion in a plan view.

Further, a touch sensor includes, a first laminate and a second laminate. The first laminate includes a transparent film substrate, a front electrode formed on one surface of the transparent film substrate a front terminal formed on the surface of the transparent film substrate where the front electrode is formed, the front terminal being connected to the front electrode, a back electrode formed on the other surface of the transparent film substrate, a back terminal formed on the surface of the transparent film substrate where the back electrode is formed, the back terminal being not overlapping with the front terminal in a plan view and being connected to the back electrode, and a connection terminal section on an inner side of one side of the transparent film substrate. The second laminate includes a transparent film substrate, a back electrode formed on a surface on a back side of the transparent film substrate, a back terminal formed on the surface of the transparent film substrate where the back electrode is formed, the back terminal being not overlapping with the connection terminal section of the first laminate in a plan view and being connected to the back electrode, and a connection terminal section on an inner side of one side of the transparent film substrate. In the first laminate and the second laminate, an adhesive layer is provided between the first laminate and the second laminate. The first laminate is provided with a cut portion obtained by cutting out a region facing the connection terminal section of the second laminate. The second laminate is provided with a cut portion obtained by cutting out a region facing the connection terminal section of the first laminate. The first laminate and the second laminate are layered with a pair of films of an upper protective film and a lower protective film. In the touch sensor in which the cut portions obtained by cutting out the regions facing the connection terminal section of the first laminate and the connection terminal section of the second laminate are provided in both of the pair of films, any of the first laminate, the second laminate, the upper protective film, and the lower protective film is formed to have a trapezoidal shape that gradually widens from an opening end toward an inward portion of the cut portion in a plan view.

Furthermore, the cut portion may be configured such that an upper base of the trapezoidal shape meeting an outer peripheral line 13 forms an outer angle of 30 degrees or more to 60 degrees or less.

Additionally, reinforcement layers may be provided on the transparent film substrate, in regions at both ends extending from an inner side toward an outer side of the cut portion at an opening end of the cut portion of the pair of protective films.

Advantageous Effects of Disclosure

A touch sensor of an aspect of the present disclosure that is excellent in cracking resistance includes, a transparent film substrate, a front electrode formed on one surface of the transparent film substrate, a front terminal formed on the surface of the transparent film substrate where the front electrode is formed, the front terminal being connected to the front electrode, a back electrode formed on the other surface of the transparent film substrate; and a back terminal formed on the surface of the transparent film substrate where the back electrode is formed, the back terminal being not overlapping with the front terminal in a plan view and being connected to the back electrode. The transparent film substrate includes a connection terminal section on an inner side of one side of the transparent film substrate. The transparent film substrate is layered with a pair of films of an upper protective film and a lower protective film. In the touch sensor in which cut portions obtained by cutting out regions facing the front terminal and the back terminal are provided in both of the pair of films, each of the cut portions is formed to have a trapezoidal shape that gradually widens from an opening end toward an inward portion of the cut portion in a plan view. Accordingly, by forming the cut portion having the trapezoidal shape that widens from the opening end toward the inward portion, stress applied to the transparent film substrate of the cut portion during pressurizing by outline blanking is relieved, and thus cracking is less likely to be generated at the interface portion of the transparent film substrate.

DETAILED DESCRIPTION

Hereinafter, regarding a touch sensor 9 of the present disclosure that is excellent in cracking resistance, an example of an embodiment will be described with reference to the drawings.

(Touch Sensor)

Figure 1A:
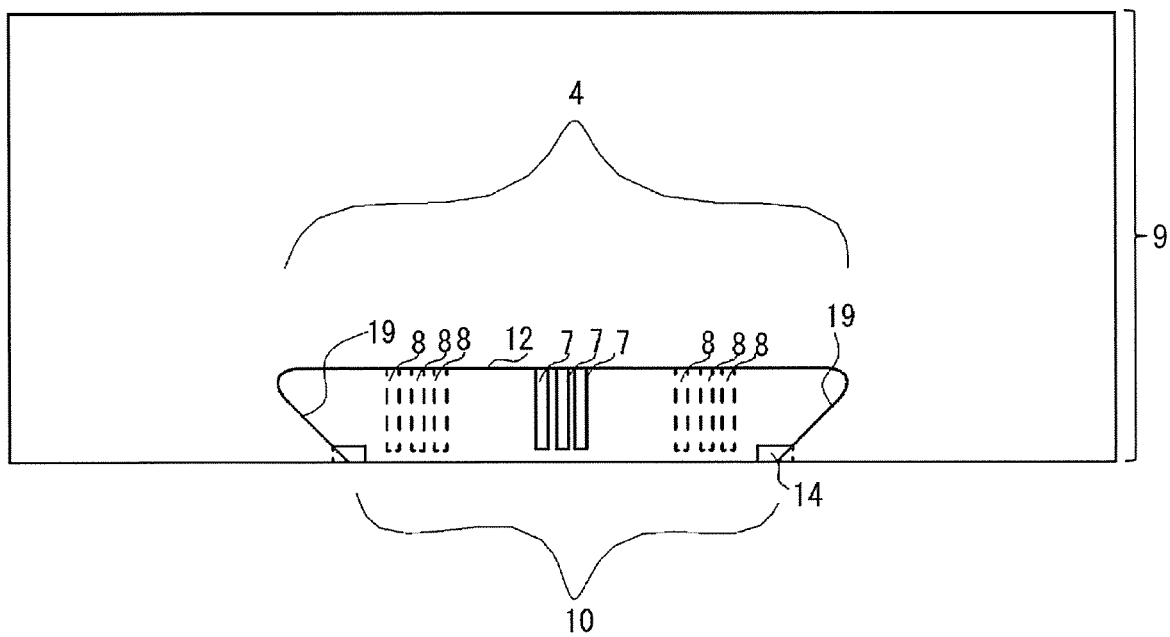
FIGS. 1a and 1b are plan views of a touch sensor according to an embodiment of the present invention.

The touch sensor 9 according to an embodiment of the present disclosure includes a transparent film substrate 1, a front electrode 5 formed on one surface of the transparent film substrate 1, front terminals 7 formed on the surface of the transparent film substrate 1 where the front electrode 5 is formed, and the front terminals 7 being connected to the front electrode 5, a back electrode 6 formed on the other surface of the transparent film substrate 1, and back terminals 8 formed on the surface of the transparent film substrate 1 where the back electrode 6 is formed, the back terminal 8 being not overlapping with the front terminals 7 in a plan view and being connected to the back electrode 6. The transparent film substrate 1 includes connection terminal sections 11 on an inner side of one side of the transparent film substrate 1. The transparent film substrate 1 is laminated with a pair of films of an upper protective film 2 and a lower protective film 3. In the touch sensor 9 in which cut portions 4 obtained by cutting regions facing the front terminals 7 and the back terminals 8 are provided in both of the pair of films, and each of the cut portions 4 is formed to have a trapezoidal shape that gradually widens from an opening end 10 toward an inward portion 12 of the cut portion 4 in a plan view (see FIGS. 1(a) and (b)).

Figure 5:
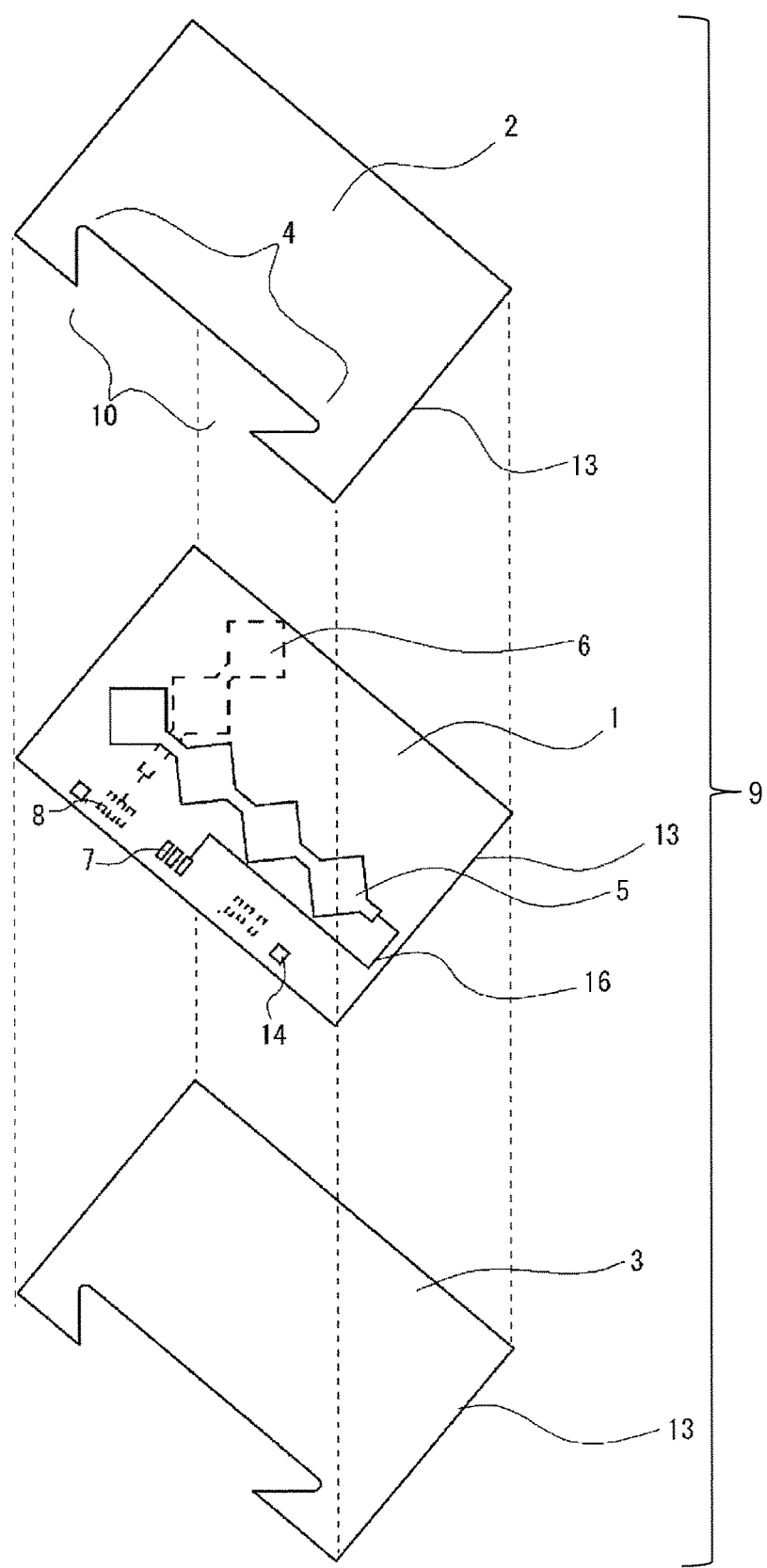
FIG. 5 is an exploded perspective view of the touch sensor according to an embodiment of the present invention.

As illustrated in FIG. 5, the transparent film substrate 1 has a structure that is laminated with the pair of films of the upper protective film 2 and the lower protective film 3, and prevents damage or the like due to external impact. Additionally, the transparent film substrate 1 is laminated with the upper protective film 2 and the lower protective film 3, therefore preventing moisture or the like from entering from the outside.

As illustrated in FIG. 5, each of the upper protective film 2 and the lower protective film 3 is provided with the cut portion 4 that allows the front terminal 7 portion and the back terminals 8 provided on the transparent film substrate 1 to be exposed, which is formed to have a trapezoidal shape that gradually widens from the opening end 10 toward the inward portion 12 of the cut portion 4 in a plan view.

(Transparent Film Substrate)

Examples of the material constituting the transparent film substrate 1 are not particularly limited as long as the material is formed of resin having transparency, however, specifically, the examples may include polyethylene resins such as cycloolefin polymer (COP) and polyethylene terephthalate (PET), and a polyester resin such as polyether sulfone. Further, the thickness of the transparent film substrate 1 used in an embodiment of the present disclosure is not particularly limited as long as the thickness can stably support the front electrode 5, the back electrode 6, the front terminals 7, the back terminals 8, the connection terminal sections 11, and the like, however, the thickness can be normally in a range of 50 μm to 100 μm. Furthermore, the material may be supplied in any form of a roll shape and a wafer shape, and the supplied form may be selected in accordance with the machining method and the processing machine.

(Front Electrode and Back Electrode)

The front electrode 5 according to an embodiment of the present disclosure is formed on one surface of the transparent film substrate 1, and the back electrode 6 is formed on the other surface of the transparent film substrate 1.

The examples of the material constituting the front electrode 5 and the back electrode 6 are not particularly limited as long as the material has desired conductivity, and the material may be a transparent material having transparency or a non-transparent material having no transparency, however, the material is preferably a transparent material. A material typically applied in the touch sensor 9 can be used as the transparent material in an embodiment of the present disclosure, and the examples of the material may include metal oxides such as indium tin oxide (ITO), zinc oxide, indium oxide, antimony doped tin oxide, fluorine-doped tin oxide, aluminum doped zinc oxide, potassium doped zinc oxide, and silicon doped zinc oxide or zinc oxide-tin oxide series, indium oxide-tin oxide series, zinc oxide-indium oxide-magnesium oxide series, or a material formed of a compound of two or more types of these metal oxides. Also, for example, metal such as aluminum, molybdenum, silver, chromium, or copper, an alloy thereof, or the like can be applied as the non-transparent material.

The formation pattern, thickness, and the like of the front electrode 5 and the back electrode 6 can be the same as those of a typical touch sensor.

(Front Terminal and Back Terminal)

The front terminals 7 according to an embodiment of the present disclosure are formed on the surface of the transparent film substrate 1 where the front electrode 5 is formed, and is connected to the front electrode 5. The back terminals 8 are formed on the surface of the transparent film substrate 1 where the back electrode 6 is formed, so as not to overlap with the front terminals 7 in a plan view, and the back terminals 8 are connected to the back electrode 6 and are directly formed on the surface of the transparent film substrate 1 (see FIG. 5).

Further, the front terminals 7 and the back terminals 8 easily and efficiently allow for connection of the touch sensor 9 and the FPC in units of the connection terminal sections 11. Note that the number or the like of terminals included in the connection terminal section 11 is set as appropriate in accordance with a heat tool or the like used for connecting to the FPC.

Figure 1B:
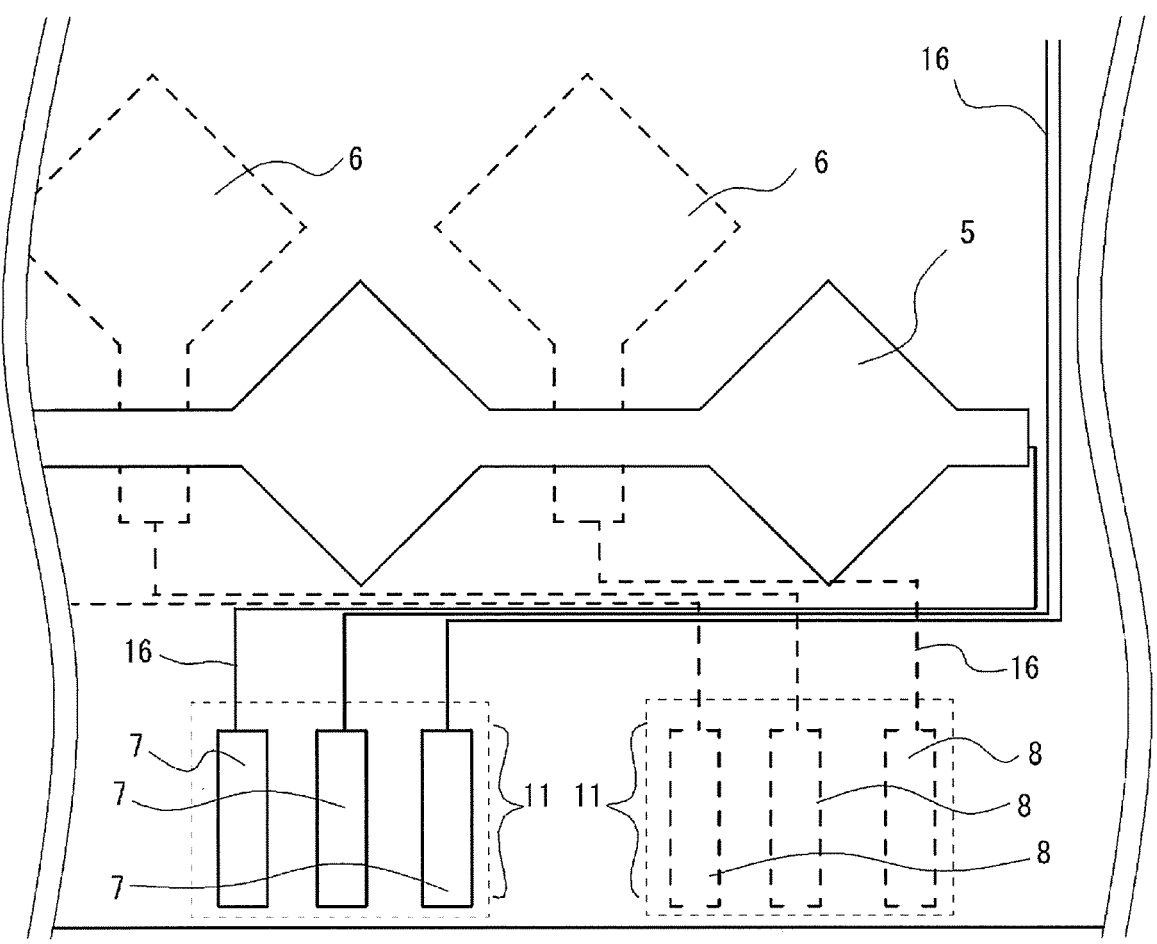

Furthermore, the connection terminal section 11 typically includes a plurality of terminals arranged in parallel on the same surface of the transparent film substrate 1 (see FIG. 1(b)).

FIG. 2 is (a) plan view and (b) cross-sectional view of the touch sensor 9 according to an embodiment of the present disclosure.

Figure 2A:
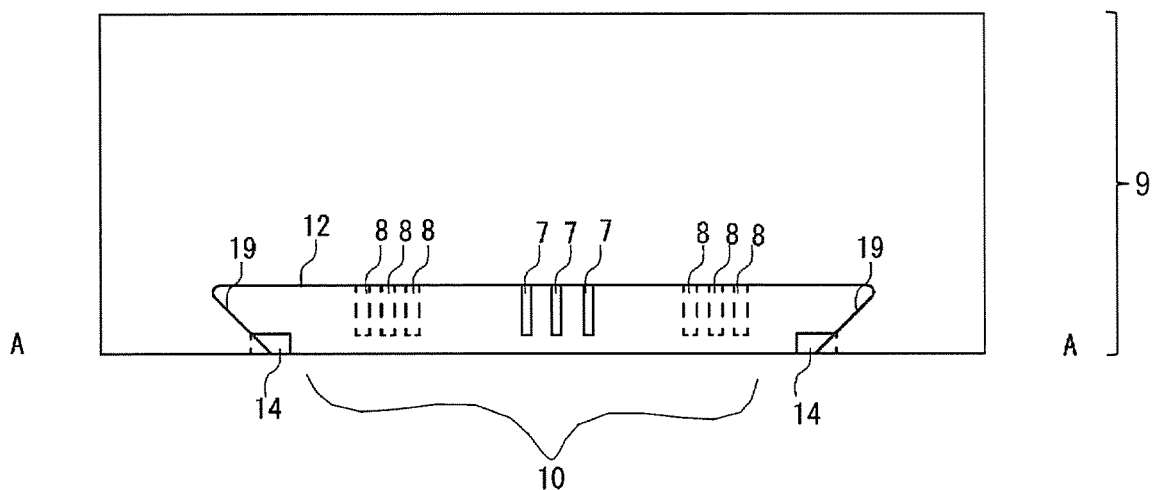
FIGS. 2a and 2b are a plan view and a cross-sectional view of the touch sensor according to an embodiment of the present invention.
Figure 2B:
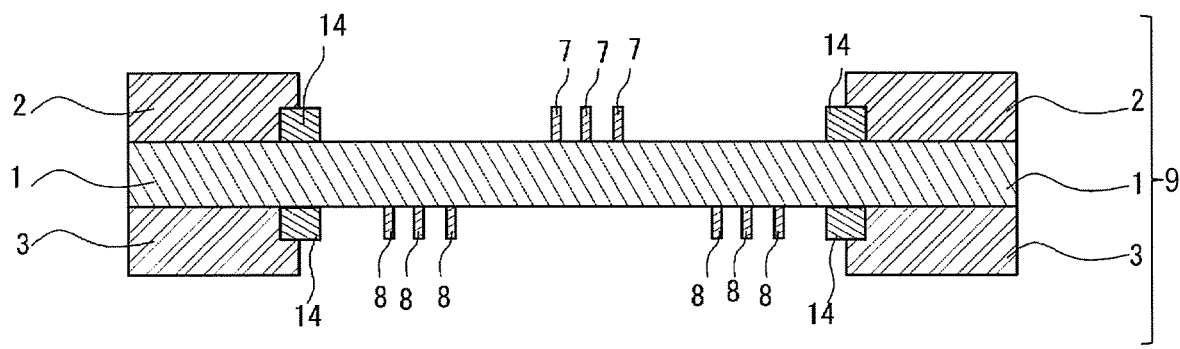

Note that the cross-sectional view of FIG. 2(b) is a cross-sectional view corresponding to a cross-section taken along line A-A in the plan view of FIG. 2(a). FIG. 5 is an exploded perspective view of the touch sensor 9 according to an embodiment of the present disclosure.

The distance between the front terminal 7 and the back terminal 8 that are located side by side in an embodiment of the present disclosure is not particularly limited and may be typical distance for the touch sensor 9.

The material constituting the front terminal 7 and the back terminal 8 according to an embodiment of the present disclosure is not particularly limited as long as the material can obtain desired conductivity. For example, aluminum, silver, copper, an alloy thereof, or the like can be used as the material.

The terminal width, thickness, and shape in a plan view of the front terminal 7 portion and the back terminal 8 portion, and the distance between the terminals in the connection terminal section 11 can be the same as those in a typical touch sensor.

(Upper Protective Film and Lower Protective Film)

The upper protective film 2 and the lower protective film 3 according to an embodiment of the present disclosure are not particularly limited as long as the upper protective film 2 and the lower protective film 3 have insulating properties, however, in a case where the upper protective film 2 and the lower protective film 3 are formed to cover the electrodes described above, the upper protective film 2 and the lower protective film 3 preferably have transparency. The examples of the upper protective film 2 and the lower protective film 3 that have insulating properties and transparency as just described may include an acrylic resin, $SiO_2$, and the like, and thermoplastic resins such as a polyurethane-based resin, a polyester-based resin, a polystyrene-based resin, a polyamide-based resin, a chlorinated polyolefin resin, a chlorinated ethylene-vinyl acetate copolymer resin, a cyclized rubber, and a coumarone-indene resin. Note that a surface-protecting adhesive film (PSA) may be used.

(Cut Portion)

The cut portion 4 according to an embodiment of the present disclosure is formed by at least cutting out a region facing the front terminal 7 portion and the back terminal 8 portion.

The cut portion 4 includes the inward portion 12 and side portions 19 continuous from both ends of the inward portion 12 to the opening end 10. The cut portion 4 is formed to have a trapezoidal shape that gradually widens from the opening end 10 toward the inward portion 12 in a plan view (see FIGS. 3 and 5).

By forming the trapezoidal shape as just described, stress applied to the transparent film substrate 1 of the cut portion 4 during pressuring by outline blanking is relieved, and cracking is less likely to be generated at the interface portion of the transparent film substrate 1. The cut portion 4 is preferably configured such that an outer angle 15 of the trapezoidal shape is in a range of 30 degrees or more to 60 degrees or less. By setting such a range, stress applied to the transparent film substrate 1 of the cut portion 4 is more relived, and cracking is more less likely to be generated at the interface portion of the transparent film substrate 1. For example, the outer angle 15 of the trapezoidal shape may be 45 degrees (see FIGS. 3 and 5).

FIG. 9 illustrates a modified example of the present embodiment.

Figure 9A:
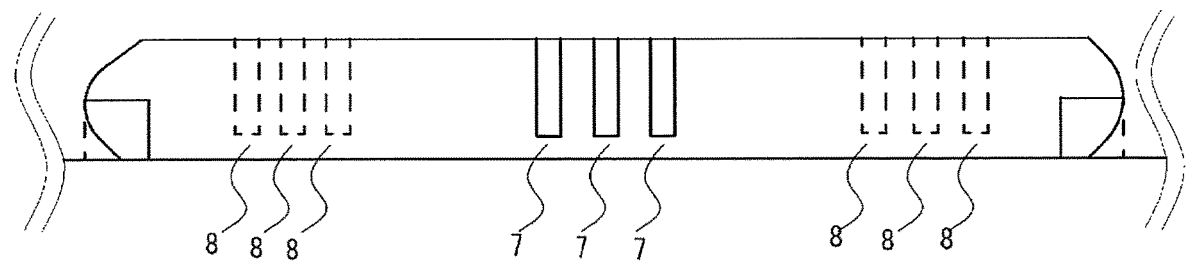
FIGS. 9a, 9b and 9c are plan views illustrating modified examples of the cut portion of the touch sensor according to an embodiment of the present invention.

In the cut portion 4, for a method in which stress applied to the transparent film substrate 1 of the cut portion 4 during pressuring by outline blanking is relieved and cracking is less likely to be generated at the interface portion of the transparent film substrate 1, the side portions 19 may be cut out in a curved shape when the outer angle 15 is in the range of 30 degrees or more to 60 degrees or less, and the outer angle 15 can be, for example, 45 degrees (See FIG. 9(a)).

Figure 9B:
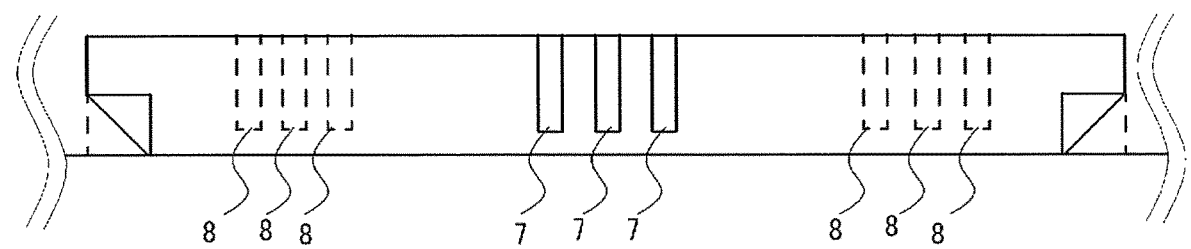

Further, for the method in which stress applied to the transparent film substrate 1 of the cut portion 4 during pressuring by outline blanking is relived and cracking is less likely to be generated at the interface portion of the transparent film substrate 1, the side portions 19 may be cut out in a polygonal shape when the outer angle 15 is in the range of 30 degrees or more to 60 degrees or less, and the outer angle 15 can be, for example, 45 degrees (See FIG. 9(b)).

Figure 9C:
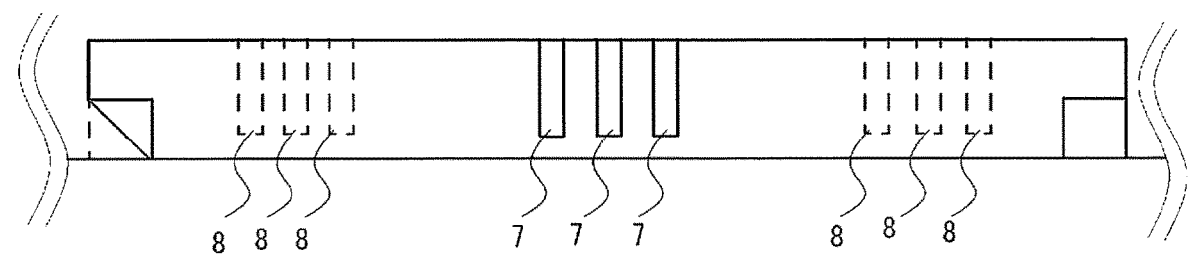

Furthermore, in accordance with properties or the like of the transparent film substrate 1, the side portions 19 may be cut in a curved shape or a polygonal shape such that either one outer angle 15 is in the range of 30 degrees or more to 60 degrees or less, and either one outer angle 15 can be, for example, 45 degrees (See FIG. 9(c)).

Additionally, for the method in which stress applied to the transparent film substrate 1 of the cut portion 4 during pressuring by outline blanking is relived and cracking is less likely to be generated at the interface portion of the transparent film substrate 1, the outer angles 15 on the both sides may not be adjusted to the same angle when the outer angle 15 is in the range of 30 degrees or more to 60 degrees or less.

In other words, the cut portion 4 may be formed in any shape as long as the outer angle 15 is in the range of 30 degrees or more to 60 degrees or less.

Figure 7:
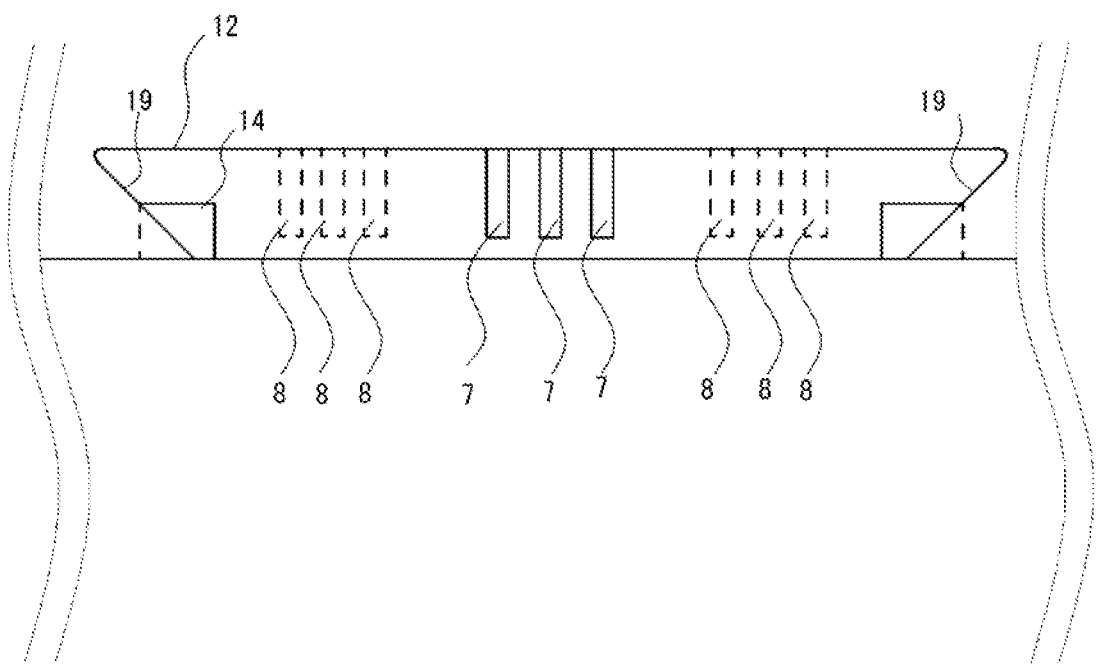
FIG. 7 is a plan view of a cut portion of the touch sensor according to an embodiment of the present invention.
Figure 8A:
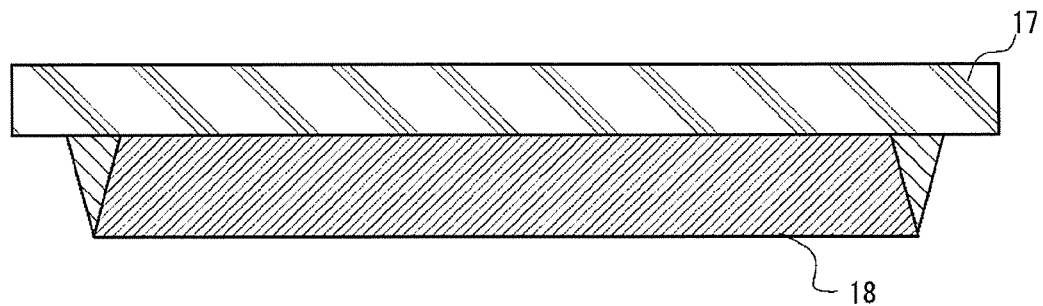
FIGS. 8a and 8b are cross-sectional views illustrating a process of outline blanking of the touch sensor.
Figure 8A:
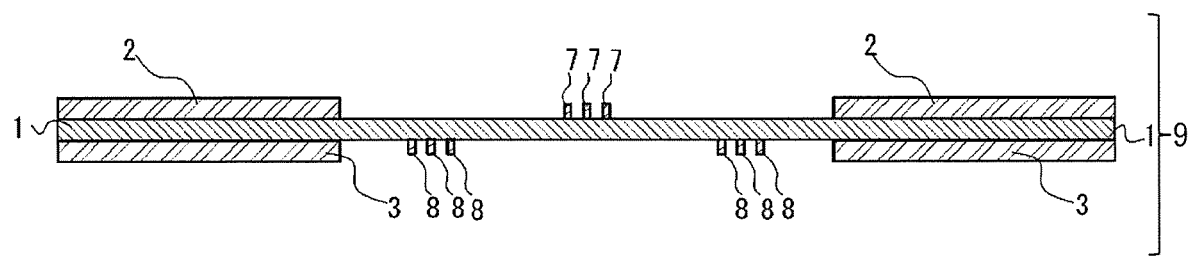
Figure 8B:
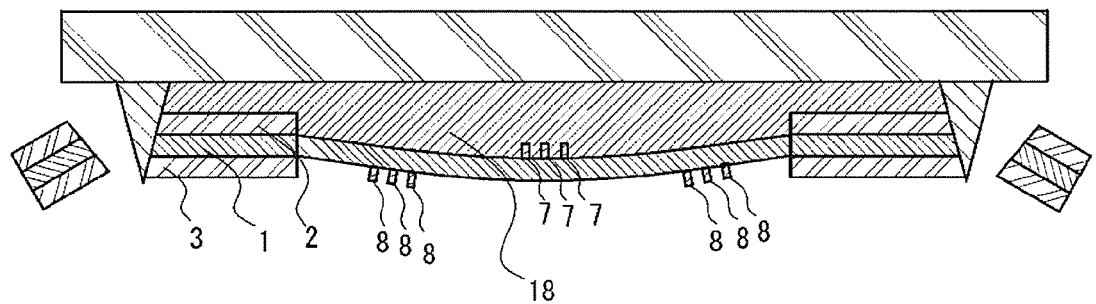

At the opening end 10 of the cut portion 4 of the pair of protective films, reinforcement members 14 may be provided on the transparent film substrate 1 in both regions extending from the inner side to the outer side of the cut portion 4. By providing the reinforcement members 14, stress applied to the transparent film substrate 1 of the cut portion 4 during pressurizing by outline blanking is further relieved, and cracking can be less likely to be generated at the interface portion of the transparent film substrate 1 (see FIGS. 4(a), (b), and FIG. 7).

Figure 4A:
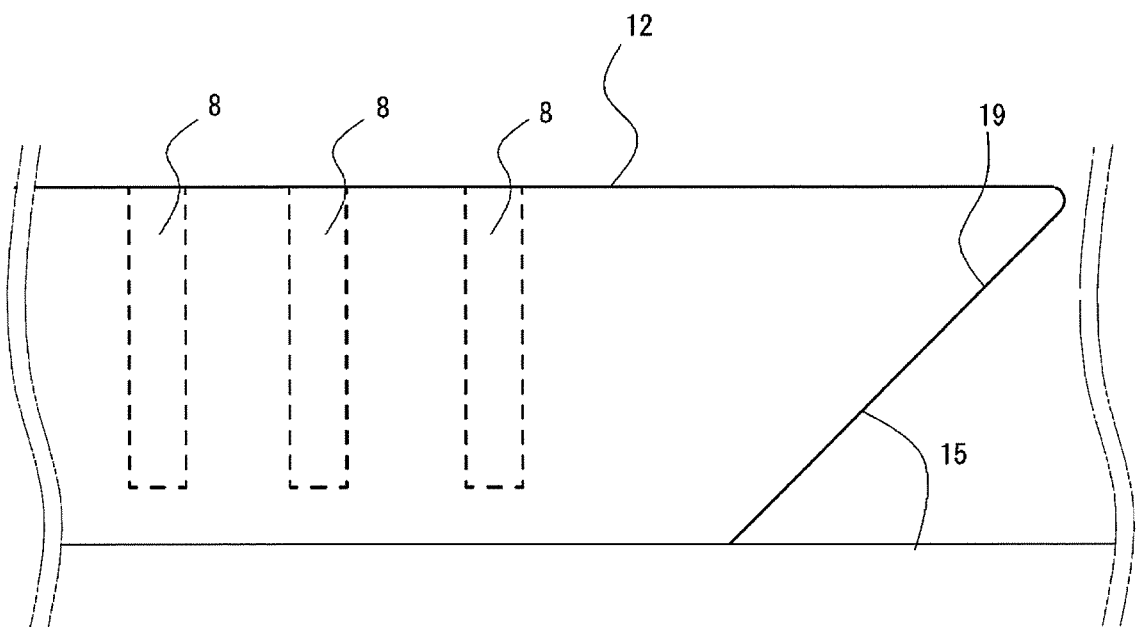
FIGS. 4a and 4b are a partial plan view of the touch sensor according to an embodiment of the present invention.
Figure 4B:
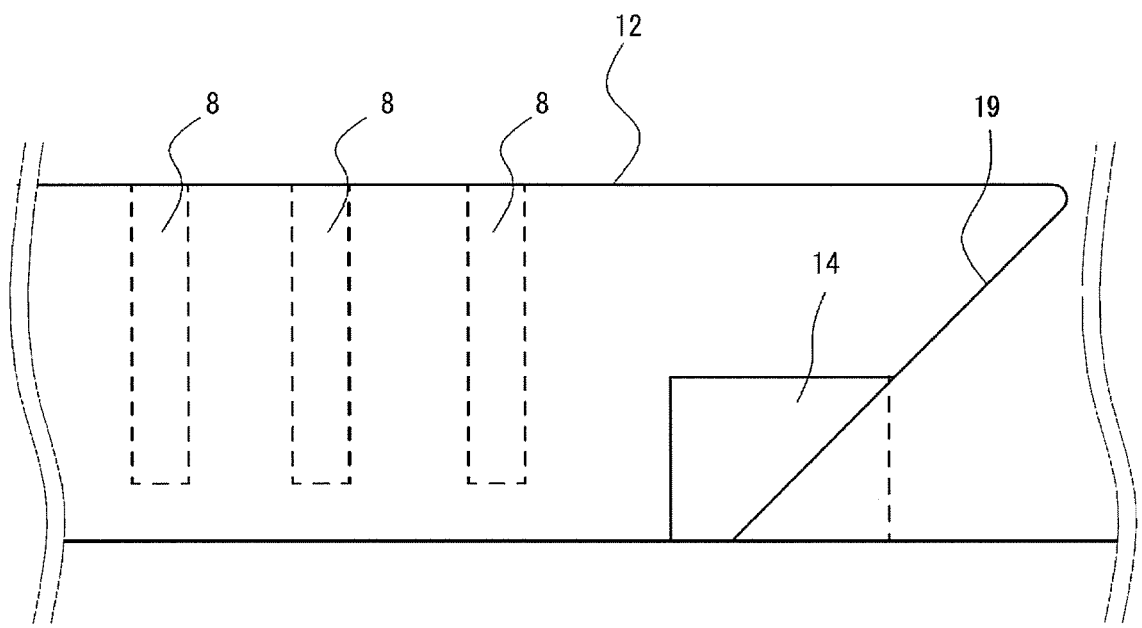

FIG. 4 is a partial plan view of the touch sensor 9 according to an embodiment of the present disclosure. FIG. 4(a) is a partial plan view of a portion in which the reinforcement member 14 is not provided, and FIG. 4(b) is a partial plan view of a portion in which the reinforcement member 14 is provided.

The material of the reinforcement member 14 may be the same as the material constituting the electrode or may be a different material, and is not particularly limited.

(Touch Sensor)

The touch sensor 9 according to an embodiment of the present disclosure includes at least the transparent film substrate 1, the front electrode 5, the front terminals 7, the back electrode 6, the back terminals 8, the upper protective film 2, and the lower protective film 3, but may have other configurations as necessary. Examples of such other configurations can include routing wiring lines 16 connecting the electrodes and the terminals.

The routing wiring lines 16 described above can be the same as those used in a typical touch sensor 9. Specifically, a routing wiring line made of the same material as that of the terminal can be used. Additionally, the line width of the routing wiring line 16 as just described can be approximately 10 µm to 100 µm.

A second aspect of the present disclosure will be described.

In other words, the touch sensor includes a first laminate 21 and a second laminate 22. The first laminate 21 includes the transparent film substrate 1, the front electrode 5 formed on one surface of the transparent film substrate 1, the front terminals 7 formed on the surface of the transparent film substrate 1 where the front electrode 5 is formed, and the front terminals 7 being connected to the front electrode 5, the back electrode 6 formed on the other surface of the transparent film substrate 1, the back terminals 8 formed on the surface of the transparent film substrate 1 where the back electrode 6 is formed, the back terminals 8 being not overlapping with the front terminals 7 in a plan view and being connected to the back electrode 6, and the connection terminal section 11 on an inner side of one side of the transparent film substrate 1. The second laminate 22 includes the transparent film substrate 1, the back electrode 6 formed on the surface on the back side of the transparent film substrate 1, the back terminals 8 formed on the surface of the transparent film substrate 1 where the back electrode 6 is formed, the back terminals 8 being not overlapping with the connection terminal section 11 of the first laminate 21 in a plan view and being connected to the back electrode and the connection terminal section 11 on an inner side of one side of the transparent film substrate 1. In the first laminate 21 and the second laminate 22, an adhesive layer 20 is provided between the first laminate 21 and the second laminate 22. The first laminate 21 is provided with the cut portion 4 obtained by cutting out a region facing the connection terminal section 11 of the second laminate 22, and the second laminate 22 is provided with the cut portion 4 obtained by cutting out a region facing the connection terminal section 11 of the first laminate 21. The first laminate 21 and the second laminate 22 are layered with a pair of films of the upper protective film 2 and the lower protective film 3. In the touch sensor in which the cut portions 4 obtained by cutting out the regions facing the connection terminal section 11 of the first laminate 21 and the connection terminal section 11 of the second laminate 22 are provided in both of the pair of films, any of the first laminate 21, the second laminate 22, the upper protective film 2, and the lower protective film 3 has a trapezoidal shape that gradually widens from the opening end 10 toward the inward portion 12 of the cut portion 4 in a plan view (see FIGS. 3 and 6).

In the above aspect, the transparent film substrate 1 provided with at least the front electrode 5, the front terminals 7, the back electrode 6, the back terminals 8, and the connection terminal section 11 is disposed as the first laminate 21, and the transparent film substrate 1 provided with at least the back electrode 6, the back terminals 8, and the connection terminal section 11 is disposed as the second laminate 22. The first laminate 21 and the second laminate 22 are layered with the pair of films of the upper protective film 2 and the lower protective film 3. Other configurations are the same as those of the invention described above.

The above aspect has an effect excellent in shielding, for example, light-emitting diode (OLED) using an organic substance in a light-emitting material and electromagnetic energy (so-called noise) emitted from a liquid crystal display (LCD) to the touch sensor 9.

FIG. 3 is (a) a plan view and (b) a cross-sectional view of the touch sensor 9 according to an embodiment of the present disclosure.

Figure 3A:
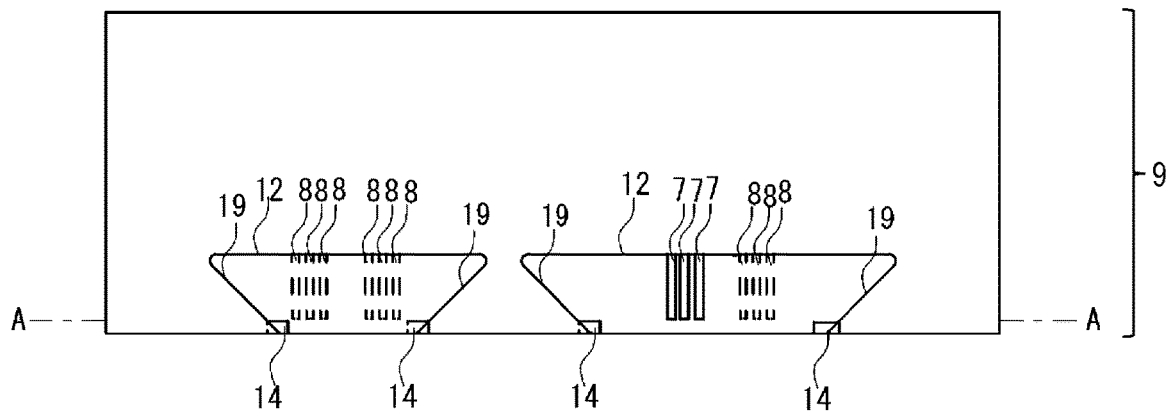
FIGS. 3a and 3b are a plan view and a cross-sectional view of the touch sensor according to an embodiment of the present invention.
Figure 3B:
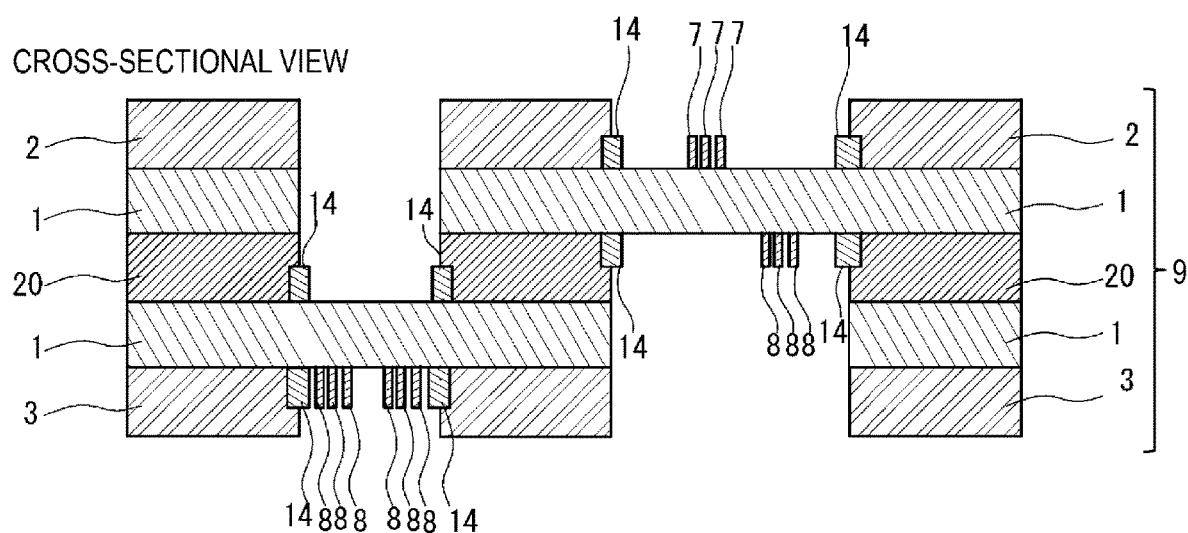

Note that the cross-sectional view of FIG. 3(b) is a cross-sectional view corresponding to a cross-section taken along line A-A in the plan view of FIG. 3(a).

Figure 6:
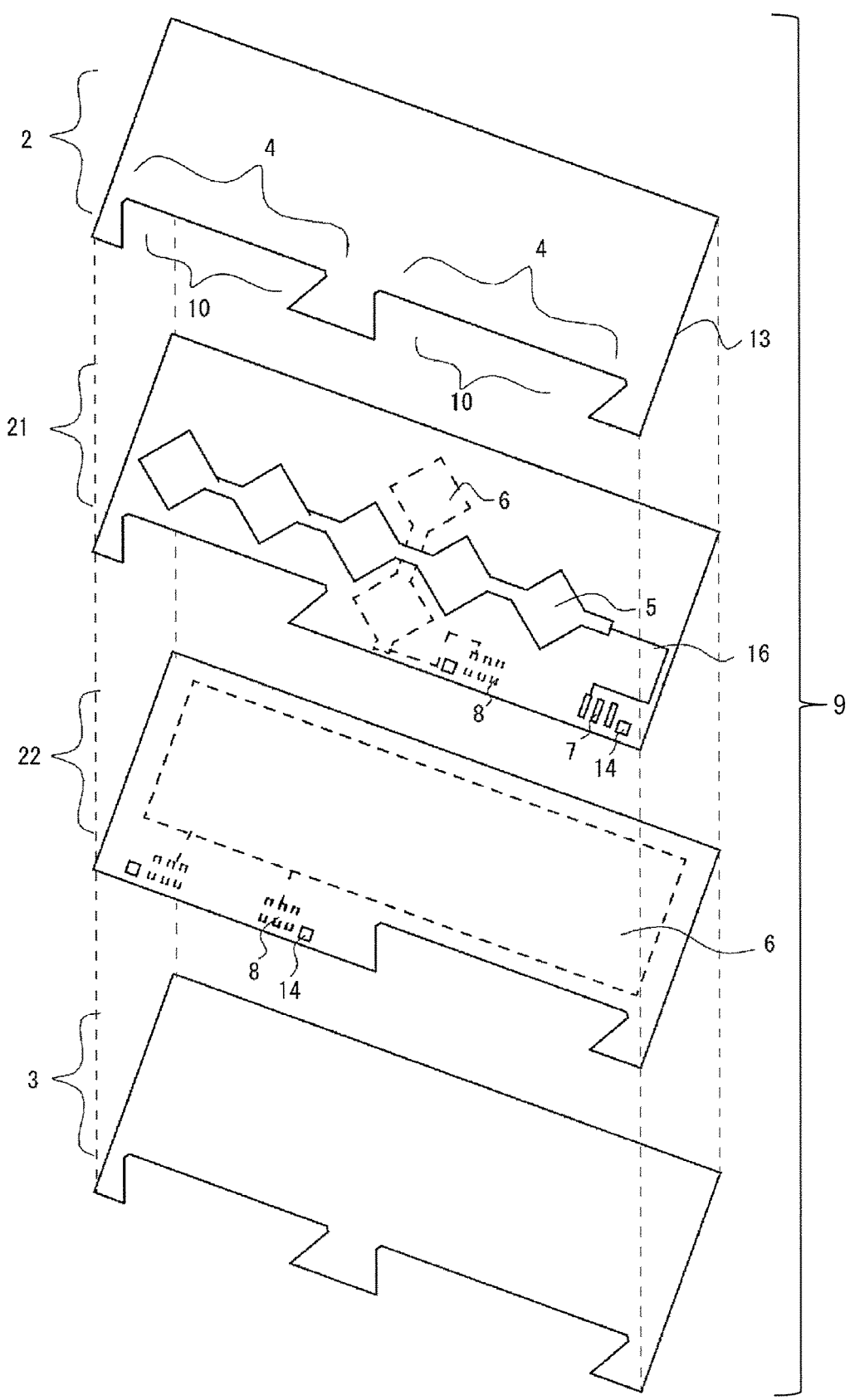
FIG. 6 is an exploded perspective view of the touch sensor according to an embodiment of the present invention.

In addition, FIG. 6 is an exploded perspective view of the touch sensor 9 according to an embodiment of the present disclosure.

The connection terminal section 11 of the second laminate 22 is provided not overlapping with the connection terminal section 11 of the first laminate 21 in a plan view. In the first laminate 21, the cut portion 4 is provided at the position corresponding to an FPC bonding portion in the region facing the connection terminal section 11 of the second laminate 22. Also, in the second laminate 22, the cut portion 4 is provided in the region facing the connection terminal section 11 of the first laminate 21. Additionally, in both of the pair of films of the upper protective film 2 and the lower protective film 3, the cut portions 4 are provided in the regions facing the connection terminal section 11 of the first laminate 21 and the connection terminal section 11 of the second laminate 22.

Further, the adhesive layer 20 for bonding the first laminate 21 and the second laminate 22 is provided between the first laminate 21 and the second laminate 22.

The cut portion 4 according to an embodiment of the present disclosure is formed by at least cutting out a region facing the front terminal 7 portion and the back terminal 8 portion. The cut portion 4 includes the inward portion 12 and the side portions 19 continuous from the both ends of the inward portion 12 to the opening end 10. The cut portion 4 is formed in a trapezoidal shape that gradually widens from the opening end 10 toward the inward portion 12 in a plan view.

The cut portion 4 is preferably configured such that the outer angle 15 of the trapezoidal shape is in the range of 30 degrees or more to 60 degrees or less. For the method in which stress applied to the transparent film substrate 1 of the cut portion 4 during pressuring by outline blanking is relived and cracking is less likely to be generated at the interface portion of the transparent film substrate 1, the outer angle 15 can be, for example, 45 degrees.

In addition to the configurations above, the same configurations as those of the first aspect may be provided. Note that, for example, a plurality of first laminates 21 may be layered in accordance with purposes, and a plurality of second laminates 22 may be layered below the first laminate 21.

Examples

The material that forms the transparent film substrate 1 is cycloolefin polymer and has a thickness of 100 μm.

The material that forms the front electrode 5 and the back electrode 6 is indium tin oxide (ITO).

The material that forms the front terminal 7 and the back terminal 8 is copper.

The material that forms the upper protective film 2 and the lower protective film 3 is a surface-protecting adhesive film (PSA).

The cut portion 4 is formed in a trapezoidal shape that gradually widens from the opening end 10 toward the inward portion 12 and is set to have the outer angle 15 of 45 degrees, and die cutting is performed with the outline blanking die 17 and thus the touch sensor 9 is obtained.

The touch sensor 9 obtained as just described provides no cracking at the interface portion of the transparent film substrate 1.

In addition, in Comparative Example 1, the side portion 19 of the cut portion 4 is formed in a rectangular shape while not inclined and is set to have the outer angle 15 of 90 degrees, and die cutting is performed with the outline blanking die 17 and thus the touch sensor 9 is obtained. The touch sensor 9 obtained as just described provides cracking at the interface portion of the transparent film substrate 1. Note that, in the present Comparative Example, the same configuration as that of Example 1 is used except for the angles described above.

Additionally, in Comparative Example 2, the cut portion 4 is formed in a tapered shape that gradually narrows from the opening end 10 toward the inward portion 12 of the cut portion 4 and is set to have the outer angle 15 of 135 degrees, and die cutting is performed with the outline blanking die 17 and thus the touch sensor 9 is obtained. The touch sensor 9 obtained as just described provides cracking at the interface portion of the transparent film substrate 1. Note that, in the present Comparative Example, the same configuration as that of Example 1 is used except for the angles described above.

BRIEF DESCRIPTION OF THE REFERENCE NUMERALS

1 Transparent film substrate
2 Upper protective film
3 Lower protective film
4 Cut portion
5 Front electrode
6 Back electrode
7 Front terminal
8 Back terminal
9 Touch sensor
10 Opening end
11 Connection terminal section
12 Inward portion
13 Outer peripheral line
14 Reinforcement member
15 Outer angle
16 Routing wiring line
17 Outline blanking die
18 Cushion material
19 Side portion
20 Adhesive layer
21 First laminate
22 Second laminate

The invention claimed is:

1. A touch sensor, comprising:
a transparent film substrate;
a front electrode formed on one surface of the transparent film substrate; a front terminal formed on the surface of the transparent film substrate where the front electrode is formed, the front terminal being connected to the front electrode; and a back electrode formed on the other surface of the transparent film substrate; and a back terminal formed on the surface of the transparent film substrate where the back electrode is formed, the back terminal being not overlapping with the front terminal in a plan view and being connected to the back electrode, wherein the transparent film substrate comprises a connection terminal section being where the front terminal and the back the urinal are provided, the transparent film substrate is layered with a pair of films of an upper protective film and a lower protective film, and in the touch sensor in which cut portions obtained by cutting out regions facing the front terminal and the back terminal are provided in both of the pair of films, each of the cut portions is formed to have a trapezoidal shape that gradually widens from an opening end toward an inward portion of the cut portion in a plan view, and reinforcement layers are provided on the transparent film substrate, in regions at both ends extending from an inner side toward an outer side of the cut portion at the opening end of the cut portion of the pair of films, and wherein the cut portion is configured such that an upper base of the trapezoidal shape meeting an outer peripheral line forms an outer angle of 30 degrees or more to 60 degrees or less.

2. A touch sensor, comprising:
a first laminate and a second laminate,
the first laminate comprising
a transparent film substrate,
a front electrode formed on one surface of the transparent film substrate,
a front terminal formed on the surface of the transparent film substrate where the front electrode is formed, the front terminal being connected to the front electrode, a back electrode formed on the other surface of the transparent film substrate, a back terminal formed on the surface of the transparent film substrate where the back electrode is formed, the back terminal being not overlapping with the front terminal in a plan view and being connected to the back electrode, and a connection terminal section being where the front terminal and the back terminal are provided, the second laminate comprising a transparent film substrate, a back electrode formed on a surface on a back side of the transparent film substrate, a back terminal formed on the surface of the transparent film substrate where the back electrode is formed, the back terminal being not overlapping with the connection terminal section of the first laminate in a plan view and being connected to the back electrode, and a connection terminal section being where the front terminal and the back terminal are provided, and wherein in the first laminate and the second laminate, an adhesive layer is provided between the first laminate and the second laminate, the first laminate is provided with a cut portion obtained by cutting out a region facing the connection terminal section of the second laminate, the second laminate is provided with a cut portion obtained by cutting out a region facing the connection terminal section of the first laminate, the first laminate and the second laminate are layered with a pair of films of an upper protective film and a lower protective film, and in the touch sensor in which the cut portions obtained by cutting out the regions facing the connection terminal section of the first laminate and the connection terminal section of the second laminate are provided in both of the pair of films, any of the first laminate, the second laminate, the upper protective film, and the lower protective film is formed to have a trapezoidal shape that gradually widens from an opening end toward an inward portion of the cut portion in a plan view.

3. The touch sensor according to claim 2, wherein, the cut portion is configured such that an upper base of the trapezoidal shape meeting an outer peripheral line forms an outer angle of 30 degrees or more to 60 degrees or less.

* * * * *